Oct. 3, 1933.  H. A. GREEN  1,928,934
TRAVELING WORK TABLE
Filed Dec. 30, 1931   3 Sheets-Sheet 1
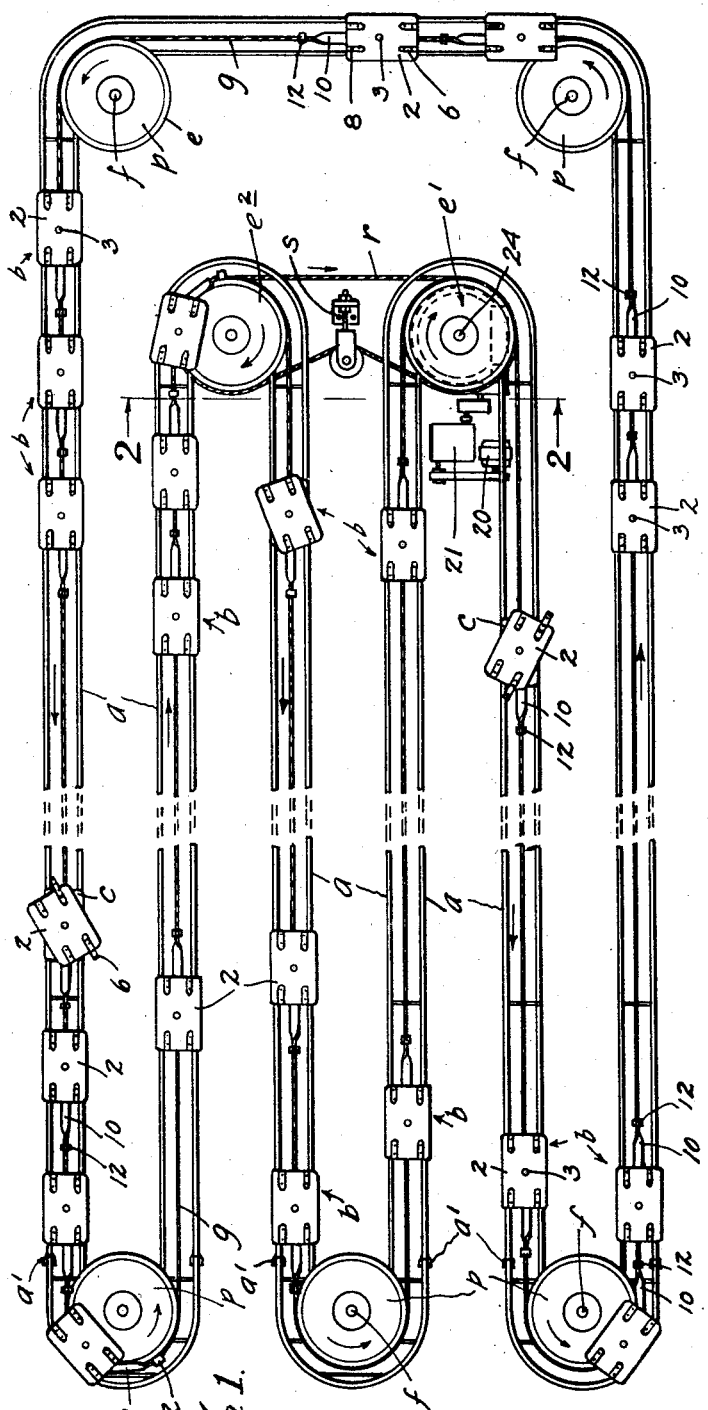
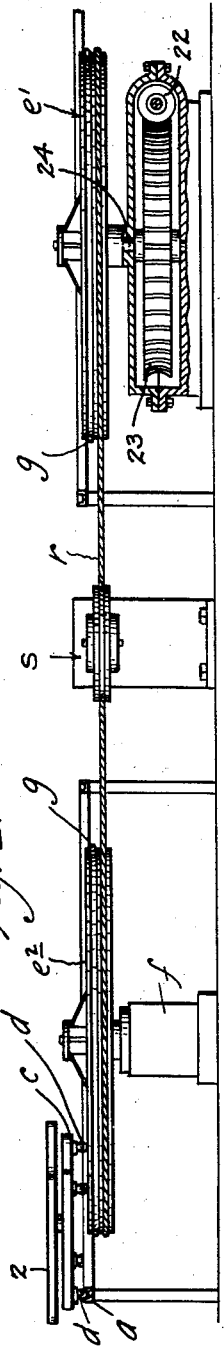
INVENTOR
Harry A. Green
BY
ATTORNEY

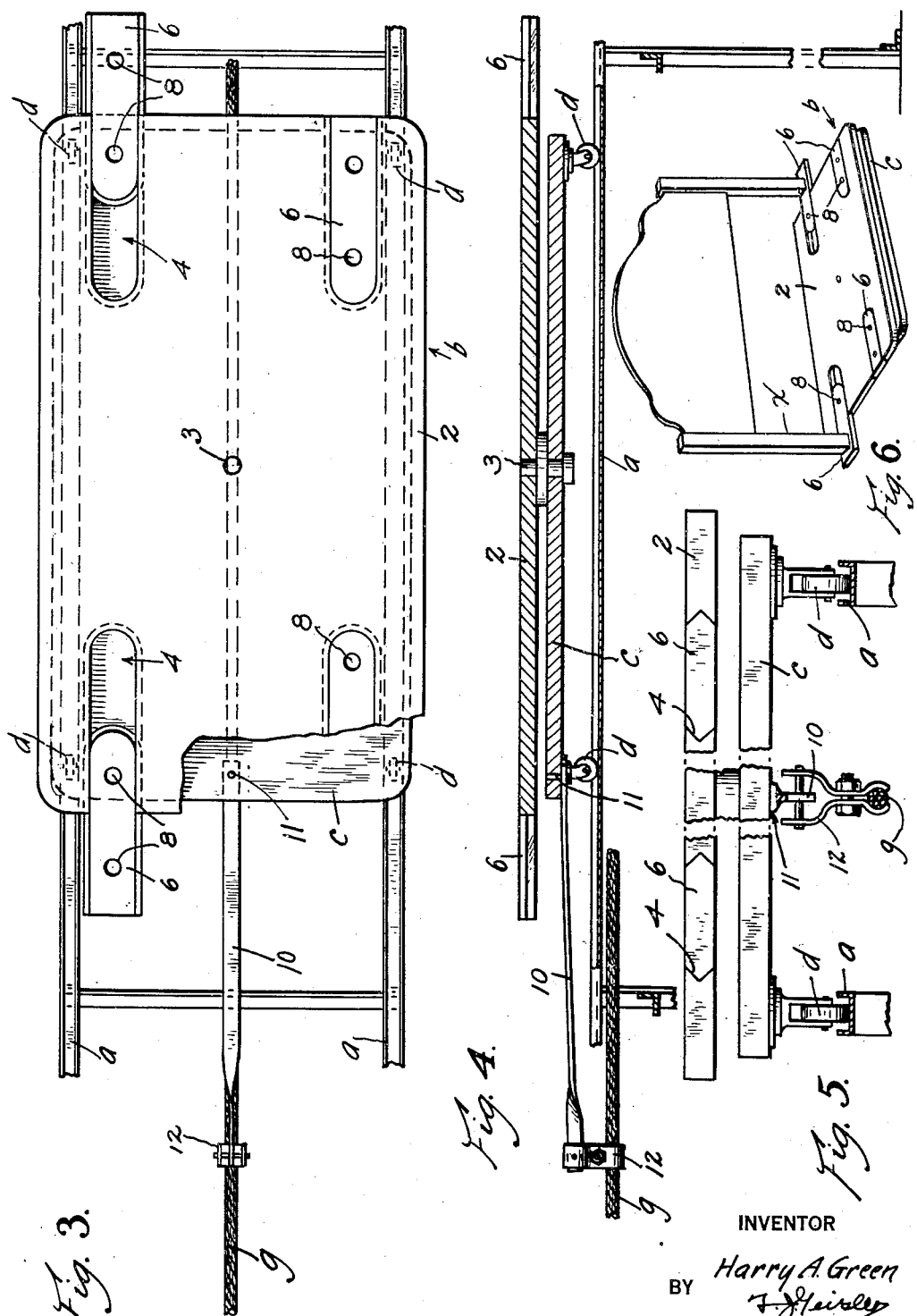

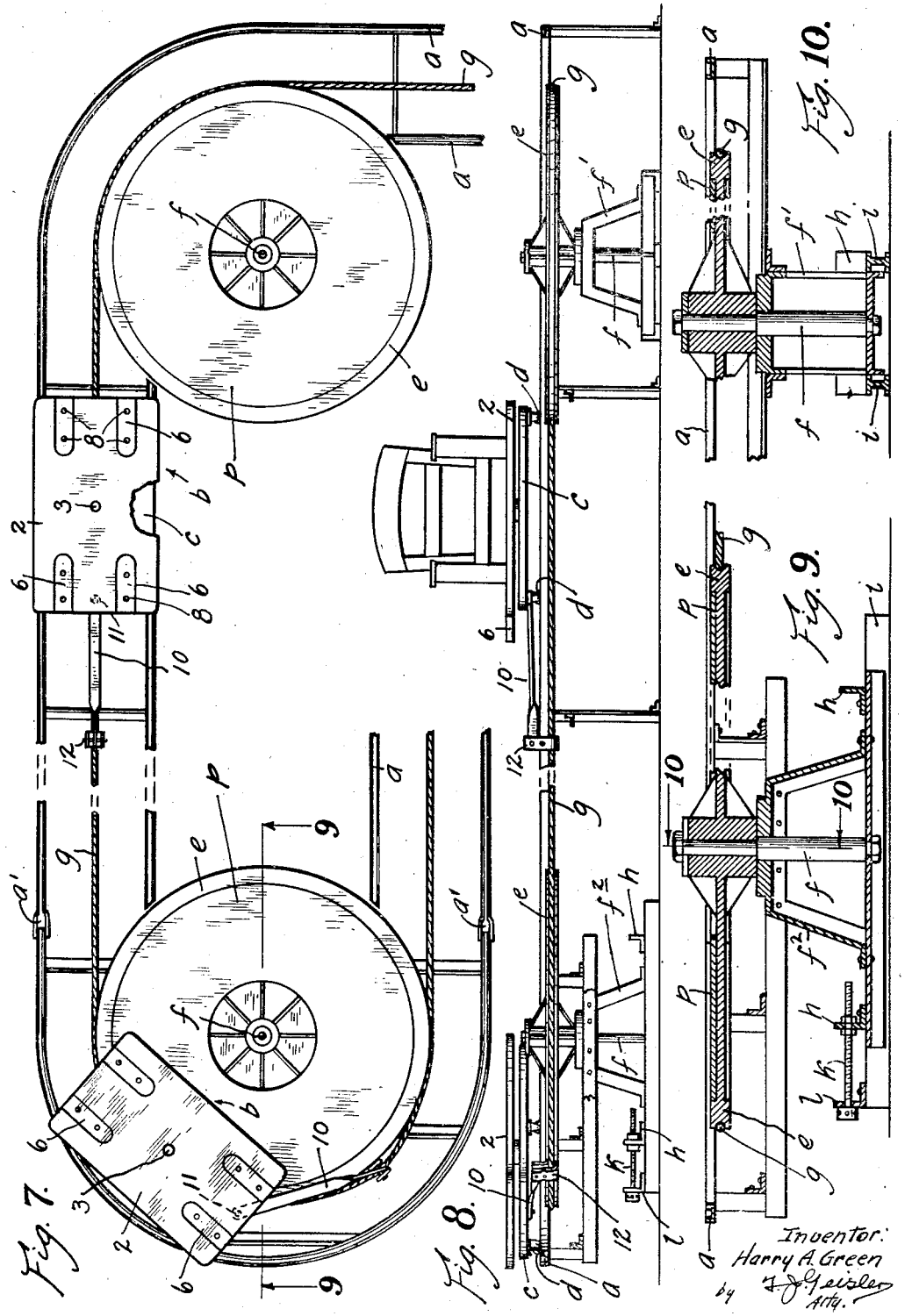

Patented Oct. 3, 1933

1,928,934

UNITED STATES PATENT OFFICE 1,928,934

TRAVELING WORK TABLE

REISSUED

Harry A. Green, Portland, Oreg.

Application December 30, 1931
Serial No. 583,901

3 Claims. (Cl. 198—181)

My invention relates to traveling work tables and the like.

In the assembling of articles of manufacture, for example furniture, it has been found most efficient and economical to place the work on a carrier mounted on an endless conveyor by which the steps in the work are distributed over a number of successive stations, at each of which a workman is stationed, to perform a particular part of the work, and by the time the carrier has reached the end of its travel, the article has been completely assembled and finished, ready for the market.

In the manufacture of furniture, as mentioned, there is not only the assembling of the sections of the frame to be done, but also varnishing and finishing; and in the case of chairs, davenports, couches and the like, the upholstering of them.

Furthermore, I have found in the use of such conveyors, that in order for the workmen to perform their work with the greatest facility, means must be provided for giving them reach access to all sides of the work without moving from their places; and in the varnishing and finishing of the furniture, to support the article in a suitable position, giving access to all the surfaces without having to hold the article or touch the surfaces freshly varnished.

The object of my invention is to provide an endless conveyor on which are mounted rotatable workholding tables, adapted to permit the workman to move the work before him into all desired positions facilitating his work, without moving from his place.

A further object of my invention is to provide an endless moving conveyor carrying work tables, the spacings of which are readily adjustable, in accordance with the time estimated necessary for each man to complete his portion of the work.

A further object of my invention is to provide a conveyor, the workholding tables of which are provided with work supporting means for articles of different dimensions, and for holding the work in different positions as it is carried forward by the conveyor.

A further object is to provide simple, but efficient driving means for an endless conveyor of the character described, even several thousand feet in length, and operating over a tortuous path; to require but a minimum of power for the operation of the conveyor.

These and other features of my invention, the details of construction and mode of operation are hereinafter fully described with reference to the accompanying drawings.

In the drawings:

Fig. 1 shows a diagrammatic plan view of my conveyor and illustrates the relative spacing of the work carrier and the revoluble work tables carried thereby;

Fig. 2 shows a section taken on the line 2—2 of Fig. 1 and illustrates the construction and arrangement of the driving means;

Fig. 3 shows a fragmentary enlarged view of one of the work carriers and illustrates the revolvable work table mounted upon it;

Fig. 4 shows a longitudinal section of the same taken on the line 4—4 of Fig. 3 and illustrates how the work table is revolubly mounted thereon;

Fig. 5 shows a fragmentary end view of a work carrier as illustrated in Fig. 3;

Fig. 6 shows a perspective view of the revolvable work table and illustrates an article of furniture secured thereto in an upright position;

Fig. 7 shows an enlarged fragmentary plan view of my conveyor and illustrates the construction and operation at the turns;

Fig. 8 shows a fragmentary elevation of the same, as shown in Fig. 7;

Fig. 9 shows a fragmentary longitudinal section taken on the line 9—9 of Fig. 7; and Fig. 10 shows a section taken on the line 10—10 of Fig. 9.

Referring to the drawings: My conveyor, see Fig. 1, comprises channel tracks $a$ arranged in a more or less tortuous path in order to provide maximum length within a room of given dimensions. A number of work carriers $b$ are provided comprising a base $c$, see Fig. 4, having caster-like rollers $d$ at each corner which ride in said tracks $a$.

A revoluble work table 2 is mounted on the base $c$ on a centrally arranged vertical shaft 3 so that the work placed thereon may be turned to permit the workman to conveniently reach all sides of it.

Longitudinally arranged, elongate slots 4 are provided in the ends of the table 2, having grooves in their sides in which elongate sections 6, having complementary tongues are slidably mounted as illustrated in Figs. 3 and 4. The sections 6 are provided with holes 8 adapted to receive pins, not shown, which may be provided in the legs of a piece of furniture, for holding, as illustrated in Fig. 6, one end of a bedstead $x$ upright while being varnished or the like.

Sheaves $e$ mounted on vertical shafts $f$ journaled in standards $f'$ are provided at the turns of the track $a$ over which an endless cable $g$ is carried. The sheaves $e$ located at the 180 degree turn of the track *a*, see Fig. 9, are adjustable longitudinally of the cable to permit the same to be tightened, by providing their standards $f^2$ with transverse angle irons *h* which extend beyond the sides of the standards and rest on parallel longitudinally arranged members *i*. An adjusting screw *k* is rotatably mounted in an angle iron section *l* secured to the floor and is threaded into the adjacent angle iron *h*. The outer rail portion of the track *a* at such turns is supported on the standards $f^2$ and is movable with the sheaves, slip joints as *a'* being provided for this purpose.

The bases *c* of the work carrier *b* are attached to the cable *g* by tongues 10, pivotally connected to the forward end of the base *c*, as at 11, and to the cable *g* by a clamping member 12 which permits a limited free movement of the tongue relatively to the cable on the turns. By these means the work carrier *b* may be adjusted on the cable *g* to provide any desired spacing the class of work being done may require.

The sheaves *e* are of substantial diameter, approximately 6 feet in order to provide low degree curves at the turns, thus reducing resistance to the operation of the conveyor by reducing the bending strains on the cable *g*. Such low degree curves also permit the work carriers to pass the curves without danger of being thrown from the tracks *a*.

The caster-like roller *d* of the work table units *b* rides in the tracks *a*, as mentioned, but at the turns the inner track *a* is displaced by the upper surfaces of the sheaves *e* which are provided with wear plate *p*, so that the rollers *d* at the beginning of the turn ride off the ends of the track onto the said wear plate, see Fig. 7, and at the end of the turn the inner rollers are brought into alignment again with the inner track by the outer rollers, which remain in the outer track, and thus ride off the surface of the sheave onto the inner track again.

The cable *g* is driven in the direction of the arrows in Fig. 1 by a suitable motor 20 and transmission 21, which drives a worm 22 meshing with a worm gear 23 mounted on the shaft 24 of a conveniently located double sheave, as *e'*.

Driving force from the sheave *e'* is also transmitted to a conveniently located double sheave *e2*, more or less centrally disposed of the conveyor, relatively to the sheave *e'* so as to distribute the driving force and relieve the strain upon the cable *g* to which it would be subjected, were it only driven from the one as sheave *e'*. To this end the sheave *e'* also has passed around it a cable *r*, which is in turn passed around the sheave *e2*. A tightener member *s* is provided for the cable *r*.

Operation

The work table units *b* are thus driven about the circuit of the tracks *a* at a predetermined speed, slow enough to permit each workman to perform his task. The work table *c* being revoluble, each workman may turn the work to bring it into the most convenient position, and in the case of a workman whose task normally consumes more time than some of the others, he is given sufficient space to take several steps laterally as the work moves before him.

I claim:

1. In a traveling endless conveyor a series of individual work carriers, a revoluble work table mounted on each carrier, said table provided with longitudinally extensible members adapted to have the work secured thereto.

2. In a traveling endless conveyor a series of individual work carriers, a revoluble work table mounted on each carrier, said table provided with longitudinal slots, members slidably mounted in said slots and provided with means for being secured to the work.

3. In a traveling endless conveyor a series of individual work carriers, each work carrier provided with a centrally located pivot post, a work table revolubly mounted on said post, said table provided with longitudinal slots, members slidably mounted in said slots and provided with means for being secured to the work.

HARRY A. GREEN.